US011252585B2

(12) United States Patent
Takahashi

(10) Patent No.: US 11,252,585 B2
(45) Date of Patent: Feb. 15, 2022

(54) ACCESS NETWORK NODE, RADIO COMMUNICATION SYSTEM, COMMUNICATION METHOD AND PROGRAM

(71) Applicant: NEC CORPORATION, Tokyo (JP)

(72) Inventor: Gen Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 136 days.

(21) Appl. No.: 16/612,796

(22) PCT Filed: May 15, 2018

(86) PCT No.: PCT/JP2018/018696
§ 371 (c)(1),
(2) Date: Nov. 12, 2019

(87) PCT Pub. No.: WO2018/212158
PCT Pub. Date: Nov. 22, 2018

(65) Prior Publication Data
US 2020/0205017 A1 Jun. 25, 2020

(30) Foreign Application Priority Data
May 17, 2017 (JP) .............................. JP2017-098069

(51) Int. Cl.
*H04W 24/04* (2009.01)
(52) U.S. Cl.
CPC .................................. *H04W 24/04* (2013.01)

(58) Field of Classification Search
CPC ... H04W 24/04; H04W 24/02; H04W 88/085; H04W 92/12; H04W 88/10
See application file for complete search history.

(56) References Cited

U.S. PATENT DOCUMENTS

| | | | | |
|---|---|---|---|---|
| 6,771,907 B1 * | 8/2004 | Yoshifuji | ............ | H04J 14/0227 398/45 |
| 9,253,709 B2 | 2/2016 | Ljung | | |
| 9,300,548 B2 | 3/2016 | Asthana et al. | | |
| 9,320,082 B2 * | 4/2016 | Deng | ...................... | H04L 1/203 |

(Continued)

FOREIGN PATENT DOCUMENTS

| | | |
|---|---|---|
| JP | 3586586 B2 | 11/2004 |
| JP | 2005-065341 A | 3/2005 |

(Continued)

OTHER PUBLICATIONS

English Translation for International Search Report for PCT/JP2018/018696; dated Aug. 7, 2018 (Year: 2018).*

(Continued)

*Primary Examiner* — Benjamin H Elliott, IV
(74) *Attorney, Agent, or Firm* — Sughrue Mion, PLLC

(57) ABSTRACT

An access network node is provided with: a link switching part configured to be capable of exchanging data by switching between an active link and a standby link established with an adjacent node; a data identification part configured to identify type of data to be exchanged with an accommodated terminal; and a controller configured to select, from between the active link and the standby link, a link to be used in exchanging data with the accommodated terminal, based on the data type.

17 Claims, 22 Drawing Sheets

(56) References Cited

U.S. PATENT DOCUMENTS

| | | | |
|---|---|---|---|
| 2002/0064166 A1* | 5/2002 | Suetsugu | H04L 41/0663 370/403 |
| 2006/0094970 A1* | 5/2006 | Drew | A61B 5/318 600/509 |
| 2007/0177552 A1* | 8/2007 | Wu | H04W 88/08 370/335 |
| 2013/0097304 A1* | 4/2013 | Asthana | H04L 41/5006 709/224 |
| 2014/0161447 A1* | 6/2014 | Graves | H04Q 11/0062 398/48 |
| 2014/0206373 A1* | 7/2014 | Ljung | H04W 48/06 455/452.1 |
| 2014/0221045 A1* | 8/2014 | Deng | H04L 1/22 455/560 |
| 2014/0286165 A1* | 9/2014 | Chowdhury | H04W 4/029 370/235 |
| 2016/0105839 A1* | 4/2016 | Ljung | H04W 48/02 455/452.1 |
| 2017/0265215 A1* | 9/2017 | Chaudhuri | H04L 12/4625 |
| 2018/0146509 A1* | 5/2018 | Ruffini | H04W 52/0206 |
| 2018/0255501 A1* | 9/2018 | Ljung | H04W 72/14 |
| 2019/0044681 A1* | 2/2019 | Zhang | H04B 7/0408 |
| 2019/0174423 A1* | 6/2019 | Zhang | H04W 52/241 |
| 2020/0204252 A1* | 6/2020 | Barbieri | H04W 36/08 |
| 2020/0205017 A1* | 6/2020 | Takahashi | H04W 24/02 |

FOREIGN PATENT DOCUMENTS

| | | |
|---|---|---|
| JP | 2012-165037 A | 8/2012 |
| JP | 2013-034080 A | 2/2013 |
| JP | 2014-045390 A | 3/2014 |
| JP | 2014-525706 A | 9/2014 |
| JP | 2014-532246 A | 12/2014 |
| JP | 2015-515835 A | 5/2015 |
| JP | 2016-009982 A | 1/2016 |
| JP | 2016-163232 A | 9/2016 |

OTHER PUBLICATIONS

"Maintenance Signal and Protection Switching Behavior of Synchronous Digital Hierarchy (SDH) Multiplexing Equipment", JT-G783, The Telecommunication Technology Committee, Apr. 19, 2001, 171 pages.

"Digital cellular telecommunications system (Phase 2+); Universal Mobile Telecommunications System (UMTS); LTE; Policy and charging control architecture", ETSI TS 123 203, 3GPP TS 23.203, 2014, vol. 12.6.0, Release 12, pp. 1-220.

International Search Report for PCT/JP2018/018696 dated Aug. 7, 2018 (PCT/ISA/210).

* cited by examiner

FIG. 2

| Service | Link |
|---|---|
| Live Streaming | Working |
| Web browsing | Working |
| Sensing (IoT) | Extra |
| ⋮ | ⋮ |

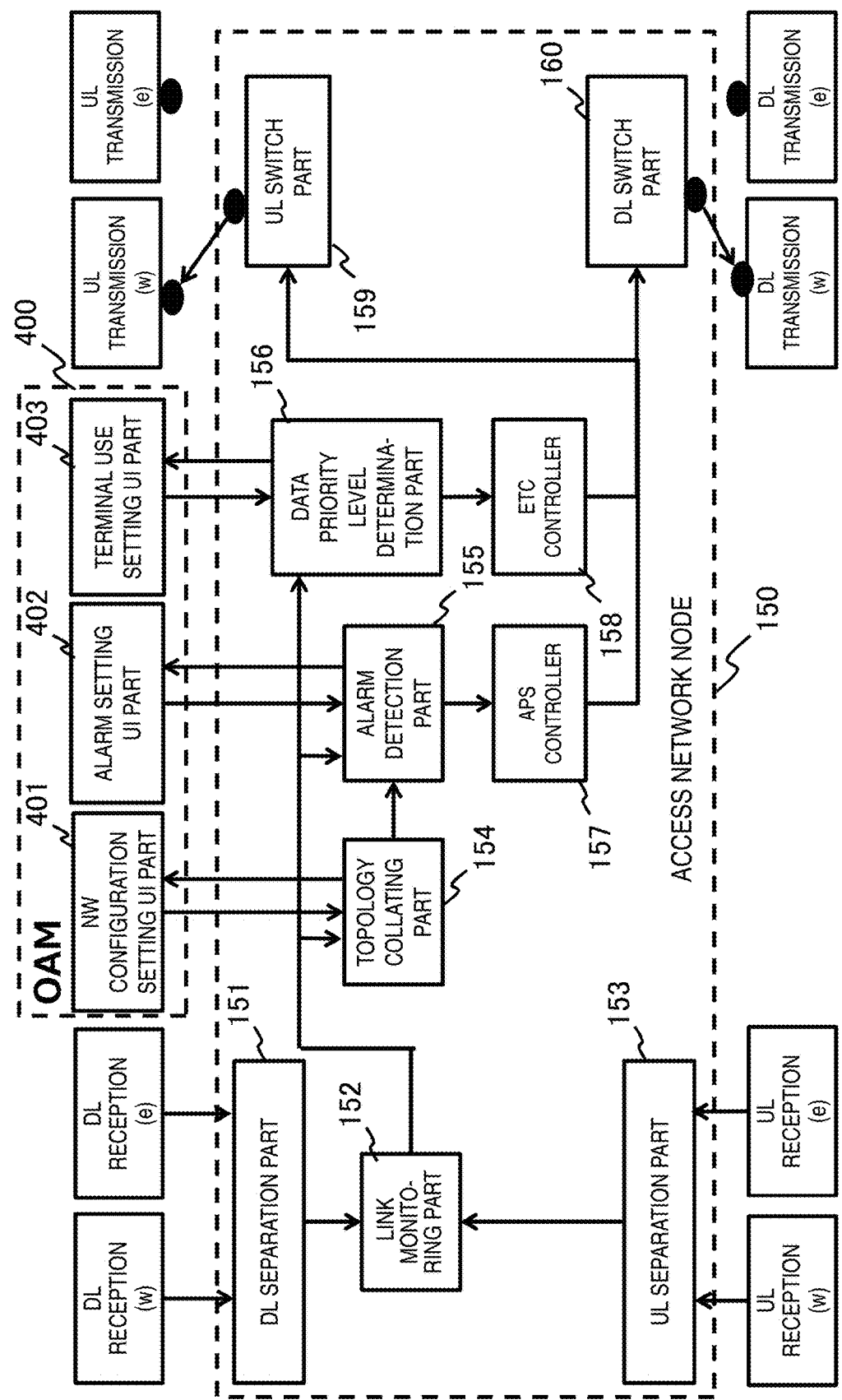

FIG. 5

| | | | | Scheme#1 | | | |
|---|---|---|---|---|---|---|---|
| b1 | b2 | b3 | b4 | b5 | b6 | b7 | b8 |
| 1 | 1 | 1 | 1 | Lockout of Protection | | | |
| 1 | 1 | 1 | 0 | Forced Switch | | | |
| 1 | 1 | 0 | 1 | Signal Fail (SF) High Priority (not used in 1+1) | | | |
| 1 | 1 | 0 | 0 | Signal Fail (SF) Low Priority | | | |
| 1 | 0 | 1 | 1 | Signal Degrade High Priority (not used in 1+1) | | | |
| 1 | 0 | 1 | 0 | Signal Degrade Low Priority | | | |
| 1 | 0 | 0 | 1 | NOT IN USE | | | |
| 1 | 0 | 0 | 0 | Manual Switch | | | |
| 0 | 1 | 1 | 1 | NOT IN USE | | | |
| 0 | 1 | 1 | 0 | Wait to Restore (Revertive only) | | | |
| 0 | 1 | 0 | 1 | NOT IN USE | | | |
| 0 | 1 | 0 | 0 | Exerciser | | | |
| 0 | 0 | 1 | 1 | NOT IN USE | | | |
| 0 | 0 | 1 | 0 | Reverse Request (Bi-directional Only) | | | |
| 0 | 0 | 0 | 1 | DO NOT REVERT (non revertive only) | | | |
| 0 | 0 | 0 | 0 | No REQUEST | | | |

FIG. 12

| UT | Service | Frequency | RAT | Severity Level |
|---|---|---|---|---|
| 1 | Voice | 2.1GHz | FDLTE | 0.0 |
| 2 | Web browsing | 800MHz | FDLTE | 1.6 |
| 3 | Online game (AR) | 5.2GHz | WiFi | 2.0 |
| 4 | Sensing (IoT) | 2.4GHz | WiFi | -2.3 |
| 5 | Live Streaming | 2.6GHz | TDLTE | 2.0 |
| 6 | Emergency | 800MHz | FDLTE | 3.0 |

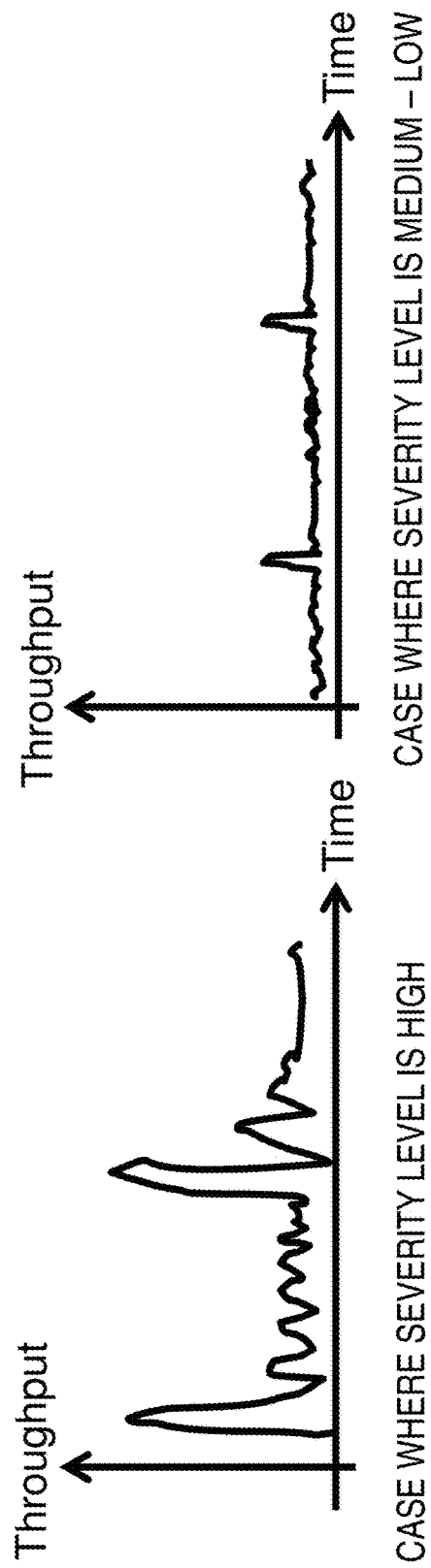
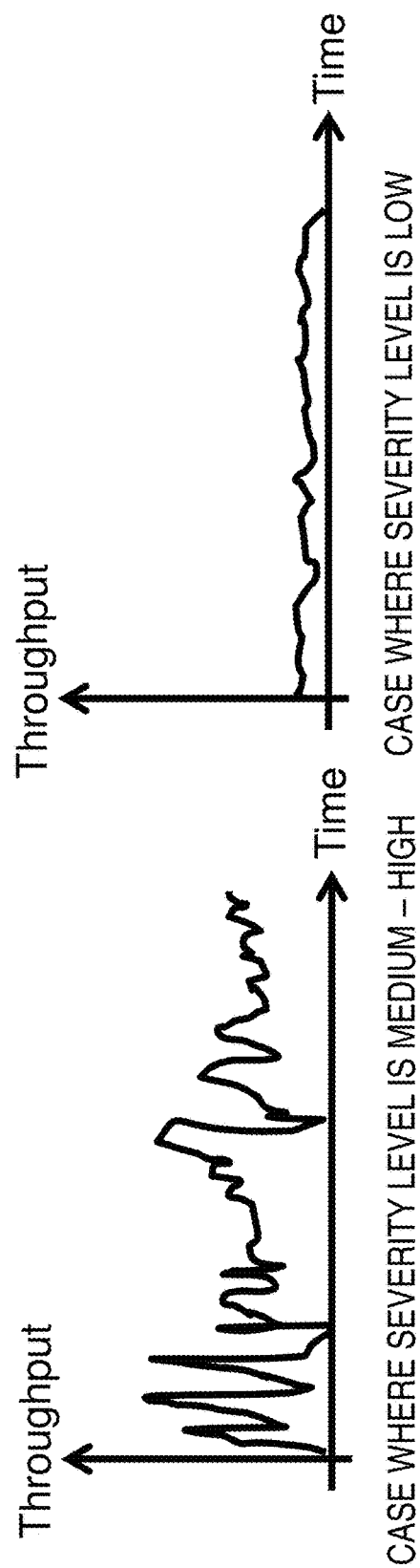

FIG. 15

| (0.2,4.5) NORMAL | (0.4,1.0) LOSS | (0.6,1.0) LOSS | (0.8,3.2) LOSS | (1.0,7.0) NORMAL | (1.2,2.0) LOSS |
|---|---|---|---|---|---|

LOSS DETERMINATION THROUGHPUT THRESHOLD  TH_THP=3.5 Mbps

LOSS PROBABILITY p=4/6

NORMAL COMMUNICATION (1-p)=2/6

Severity Level= $\log_2(p/1-p) = \log_2(4/2) = 1$

LOSS DETERMINATION THROUGHPUT THRESHOLD  TH_THP=0.1 Mbps

LOSS PROBABILITY p=1/6

NORMAL COMMUNICATION (1-p)=5/6

Severity Level = $\log_2(p/1-p) = \log_2(1/5) = -2.32$

LOSS DETERMINATION THROUGHPUT THRESHOLD  TH_THP=3.5 Mbps

LOSS PROBABILITY p=5/6

NORMAL COMMUNICATION (1-p)=1/6

Severity Level= $\log_2(p/1-p) = \log_2(5/1) = 2.32$

FIG. 18

3GPP TS 23.203 version 12.6.0 Release 12     44     ETSI TS 123 203 V12.6.0 (2014-09)

Table 6.1.7: Standardized QCI characteristics

| QCI | Resource Type | Priority Level | Packet Delay Budget | Packet Error Loss Rate (NOTE 2) | Example Services |
|---|---|---|---|---|---|
| 1 (NOTE 3) | GBR | 2 | 100 ms (NOTE 1) | $10^{-2}$ | Conversational Voice |
| 2 (NOTE 3) | | 4 | 150 ms (NOTE 1) | $10^{-3}$ | Conversational Video (Live Streaming) |
| 3 (NOTE 3) | | 3 | 50 ms (NOTE 1) | $10^{-3}$ | Real Time Gaming |
| 4 (NOTE 3) | | 5 | 300 ms (NOTE 1) | $10^{-6}$ | Non-Conversational Video (Buffered Streaming) |
| 65 (NOTE 9) | | 0.7 | 75ms (NOTE 7, NOTE 8) | $10^{-2}$ | Mission Critical user plane Push To Talk voice (e.g., MCPTT) |
| 66 | | 2 | 100 ms (NOTE 1, NOTE 8) | $10^{-2}$ | Non-Mission-Critical user plane Push To Talk voice |
| 5 (NOTE 3) | Non-GBR | 1 | 100 ms (NOTE 1) | $10^{-6}$ | IMS Signalling |
| 6 (NOTE 4) | | 6 | 300 ms (NOTE 1) | $10^{-6}$ | Video (Buffered Streaming) TCP-based (e.g., www, e-mail, chat, ftp, p2p file sharing, progressive video, etc.) |
| 7 (NOTE 3) | | 7 | 100 ms (NOTE 1) | $10^{-3}$ | Voice, Video (Live Streaming) Interactive Gaming |
| 8 (NOTE 5) | | 8 | 300 ms (NOTE 1) | $10^{-6}$ | Video (Buffered Streaming) TCP-based (e.g., www, e-mail, chat, ftp, p2p file sharing, progressive video, etc.) |
| 9 (NOTE 6) | | 9 | | | |
| 69 (NOTE 9) | | 0.5 | 60 ms (NOTE 7) | $10^{-6}$ | Mission Critical delay sensitive signalling (e.g., MC-PTT signalling) |
| 70 | | 5.5 | 200 ms (NOTE 7) | $10^{-6}$ | Mission Critical Data (e.g. example services are the same as QCI 6/8/9) |

FIG. 19

| Scheme#2 | | | | | | | |
|---|---|---|---|---|---|---|---|
| b1 | b2 | b3 | b4 | b5 | b6 | b7 | b8 |
| 1 | 1 | 1 | 1 | Extra Traffic / EXTRA TRAFFIC CHANNEL | | | |
| 1 | 1 | 1 | 0 | PROTECTED CHANNEL (1~14) | | | |
| ⋮ | ⋮ | ⋮ | ⋮ | | | | |
| 0 | 0 | 0 | 1 | | | | |
| 0 | 0 | 0 | 0 | | | | |

FIG. 20

| Scheme#2 | | | | | | | |
|---|---|---|---|---|---|---|---|
| b1 | b2 | b3 | b4 | b5 | b6 | b7 | b8 |

PROTECTION MODE
b5=0 : 1+1
b5=1 : 1+N

| b6 | b7 | b8 | |
|---|---|---|---|
| 1 | 1 | 1 | AIS-L Alarm Indication Signal |
| 1 | 1 | 0 | RDI-L |
| 1 | 0 | 1 | Provisioned for Bidirectional Switching |
| 1 | 0 | 0 | Provisioned for Unidirectional Switching |
| 0 | 1 | 1 | Reserved / REGION FOR FUTURE USE |
| 0 | 1 | 0 | |
| 0 | 0 | 1 | |
| 0 | 0 | 0 | |

ACCESS NETWORK NODE, RADIO COMMUNICATION SYSTEM, COMMUNICATION METHOD AND PROGRAM

CROSS-REFERENCE TO RELATED APPLICATIONS

This application is a National Stage of International Application No. PCT/JP2018/018696 filed May 15, 2018, claiming priority based on Japanese Patent Application No. 2017-098069 (filed on May 17, 2017) the content of which is hereby incorporated in its entirety by reference into this specification.

FIELD

The present disclosure relates to an access network node, a radio communication system, a communication method and a program, and in particular to an access network node, a radio communication system, a communication method and a program, that are disposed in an access network in which are disposed a base station containing a mobile terminal or the like or a handset or the like.

BACKGROUND

In mobile communications, standardization of 5th generation communication systems is progressing. Henceforth, it is expected that various equipment referred to as the IoT (Internet of Things) will be connected to a network, and traffic volume will rapidly increase.

C-RAN (referred to as Cloud-Radio Access Network; Centralized RAN) is a proposal for handling this increase in traffic volume. In a C-RAN, heretofore base band units (BBU) provided in a base station were centrally configured in a master station, and this master station controls multiple slave stations referred to as RRU (Remote Radio Unit; also known as Remote Radio Head) via optical cables or the like. A CPRI (Common Public Radio Interface) or the like is used as a communication interface between the master station and slave station.

Patent Literature (PTL) 1 discloses a mobile network in which it is possible to configure connectivity and continuity giving different priority levels for different services and applications, with services provided with the same wireless interface or wireless system. Specifically, the mobile network includes a virtualization handling base station housing switch provided with functionality to dynamically change used resource quantity in virtual channel units; this virtualization handling base station housing switch has a function to determine whether or not a dedicated network should be newly arranged based on service identification and be provided as a virtual network in question, and to cause a network, that provides a service, to handover to a new virtual network from a common virtual network.

Patent Literature 2 discloses an optical ring system that can realize a protection function only against wavelengths occurring in a failure, when a failure occurs with some wavelengths in a point-to-point wavelength multiplexing transmission system.

In Non-Patent Literature (NPL) 1, protection operation of a warning system/switching system in a SDH (Synchronous Digital Hierarchy) multiplexer is prescribed. Non-Patent Literature 2 is a specification related to QoS policy and billing control prescribed in 3GPP.

[PTL 1]
Japanese Patent Kokai Publication No. JP2014-45390A
[PTL 2]
Japanese Patent No. 3586586
[NPL 1]
The Telecommunication Technology Committee "JT-G783 Maintenance Signal and Protection Switching Behavior of Synchronous Digital Hierarchy (SDH) Multiplexing Equipment", (online), (search performed on Apr. 20, 2017), Internet <URL: http://www.ttc.or.jp/jp/document_list/pdf/j/STD/JT-G783v3.pdf>
[NPL 2]
ETSI TS 123 203 V12.6.0 (2014-09) (3GPP TS 23.203 version 12.6.0 Release 12), (online) (search performed on Apr. 20, 2017), Internet <http://www.etsi.org/deliver/etsi_ts/123200_123299/123203/12.06.00_60/ts_123203v120600p.pdf>

SUMMARY

The following analysis is given according to the present disclosure. High level reliability is naturally required also in communication between a BBU and an RRU in the abovementioned C-RAN configuration. However, among terminals accommodated in an RRU, some require high QoS (Quality of Service) and some do not. For example, among data from a sensor terminal which is a representative IoT device, there are many devices where delay is tolerated. Conversely, also with sensor terminals, there are terminals that transmit data where promptness is required, such as incident information. Laying cables in a standby system between an RRU and a BBU in order to improve reliability may be considered, but in such a case, usage efficiency of channels becomes a problem.

In Patent Literature 1, a configuration is disclosed in which service is initially started in a common virtual network, a new virtual network is started in accordance with service type, and handover is performed between virtual networks, but no solution is disclosed that is specialized for an access network, including consideration of channel failure and quality degrade.

The abovementioned issue is not a problem unique to a C-RAN configuration, but is an issue generally relevant to access networks that transfer large quantities of data where one master station is connected to a plurality of slave stations, according to various topologies such as ring type, star type and tree type.

It is an object of the disclosure to provide an access network node, a radio communication system, a communication method and a program, that contribute both to improving reliability in an access network where traffic volume is expected to further increase henceforth, and to improving channel efficiency thereof.

According to a first aspect, an access network node is provided with a link switching part configured to be capable of exchanging data by switching an active link and a standby link established with an adjacent node. The access network node is further provided with a data identification part configured to identify type of data to be exchanged with an accommodated terminal. The access network node is further provided with a controller configured to select a link to be used in exchange of data with the accommodated terminal, from among the active link and the standby link, based on the data type.

According to a second aspect, a radio communication system is provided that includes a fronthaul disposed to be opposite the abovementioned access network node.

According to a third aspect, a communication method by an access network node including a link switching part configured to be capable of exchanging data by switching between an active link and a standby link established with an adjacent node. The method comprises: identifying type of data to be exchanged with an accommodated terminal; and selecting, from between the active link and the standby link, a link to be used in exchanging data with the accommodated terminal, based on the data type. The method is tied to a particular machine that is an access network node provided with the abovementioned link switching part.

According to a fourth aspect, a computer program is provided that causes a computer installed in an access network node including a link switching part that is capable of exchanging data by switching between an active link and a standby link established with an adjacent node, to execute processes of: identifying type of data to be exchanged with an accommodated terminal; and selecting, from between the active link and the standby link, a link to be used in exchanging data with the accommodated terminal, based on the data type. It is to be noted that this program may be recorded on a computer-readable (non-transient) storage medium. That is, the present disclosure may be embodied as a computer program product.

The meritorious effects of the present disclosure are summarized as follows.
According to the present disclosure, it is possible to combine improvement in reliability and channel efficiency thereof in an access network. That is, the present disclosure converts an access network node described in the background technology to one with improvement in reliability and channel efficiency.

BRIEF DESCRIPTION OF THE DRAWINGS

FIG. 2 is a diagram showing an example of a link selection rule used in an exemplary embodiment of the disclosure.

FIG. 4 is a diagram showing a configuration of an access network node in a first exemplary embodiment of the disclosure.

FIG. 5 is a diagram showing a configuration of APS control data used in the first exemplary embodiment of the disclosure.

FIG. 12 is a diagram showing a calculation example of data importance level in the first exemplary embodiment of the disclosure.

FIGS. 13A-13D are diagrams illustrating Severity Level concept in the first exemplary embodiment of the disclosure.

FIG. 15 is a diagram showing a calculation example of Severity Level in the first exemplary embodiment of the disclosure.

FIG. 18 is a diagram showing an example of QCI definitions.

FIG. 19 is a diagram showing a configuration of ETC control data used in the first exemplary embodiment of the disclosure.

FIG. 20 is a diagram illustrating another example of ETC control data used in the first exemplary embodiment of the disclosure.

MODES

Figure 1:
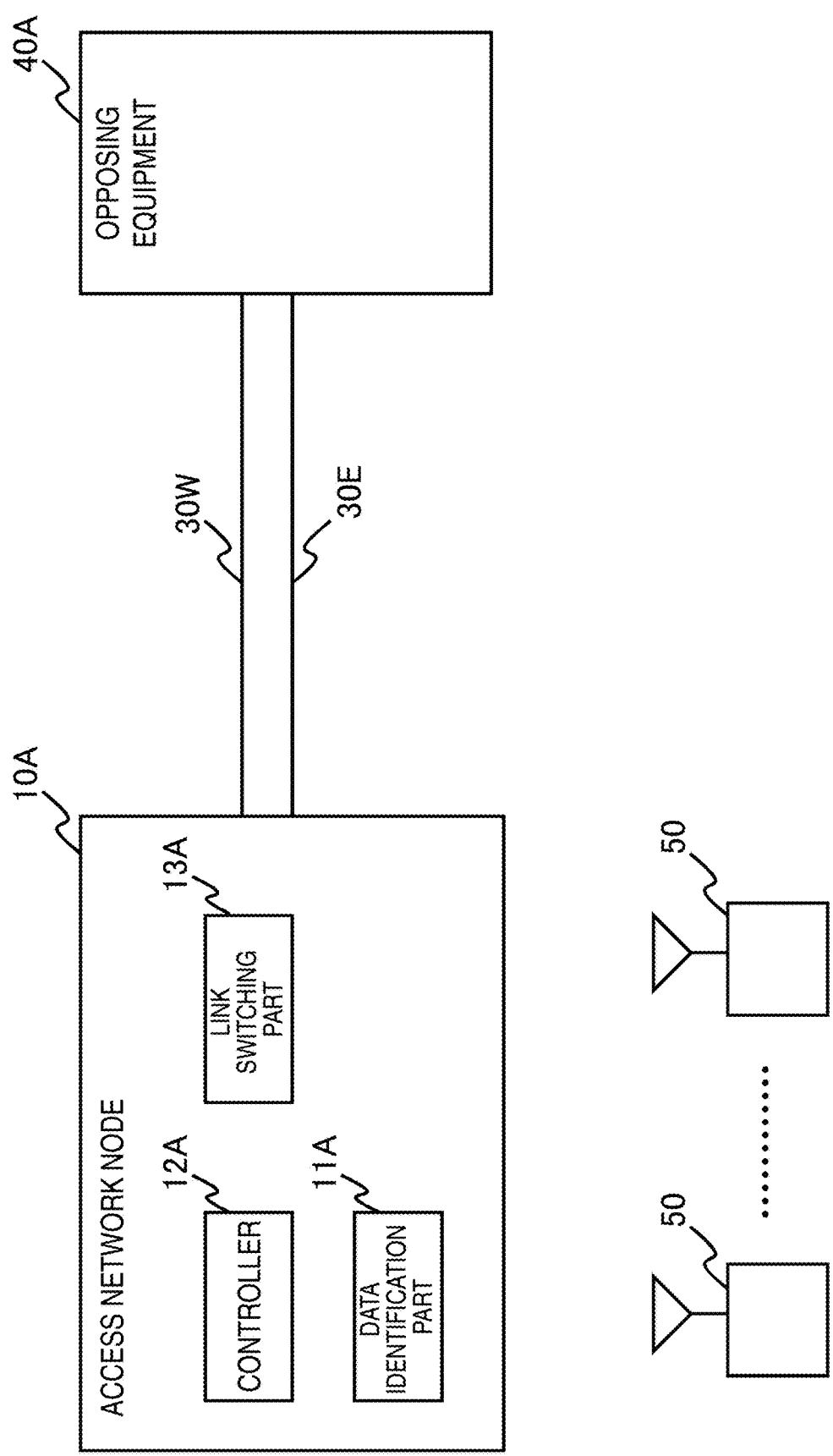
FIG. 1 is a diagram showing a configuration of an exemplary embodiment of the present disclosure.

First, a description is given of an outline of exemplary embodiments of the present disclosure, making reference to the drawings. It is to be noted that reference symbols in the drawings attached to this outline are added to respective elements for convenience as examples in order to aid understanding, and are not intended to limit the present disclosure to modes illustrated in the drawings. Connection lines between blocks in the diagrams referred to in the following description include both unidirectional and bidirectional. Unidirectional arrows schematically show flow of main signals (data), but do not exclude bidirectionality. A port or interface is present at input/output connection points of respective blocks in the diagram, but illustrations thereof are omitted.

In an exemplary embodiment, the disclosure, as shown in FIG. 1, may be implemented by an access network node 10A provided with a link switching part 13A, a data identification part 11A and a controller 12A.

More specifically, the link switching part 13A can exchange data by switching an active link 30W and a standby link 30E established with an adjacent node (opposing equipment FIG. 1).

The data identification part 11A identifies type of data exchanged with an accommodated terminal 50. The controller 12A selects a link used in exchange of data with the accommodated terminal 50, from among the active link 30W and the standby link 30E, based on the data type.

For example, when the type of data shown in the "Service" column of FIG. 2 is obtained, the controller 12A selects a link used in exchanging data with the terminal 50, as shown in the "Link" column of FIG. 2. In the example of FIG. 2, for Live Streaming or Web Browsing data, Working, namely the active link 30W (W is the first letter of Working)

is selected. Meanwhile, for Sensing (IoT) data, Extra, namely the standby link 30E is selected. In this way, by configuring the active link 30W and the standby link 30E, it is normally possible to achieve an improvement in channel efficiency by using the standby link 30E in forwarding data for which delay is tolerated, while maintaining reliability.

First Exemplary Embodiment

Figure 3:
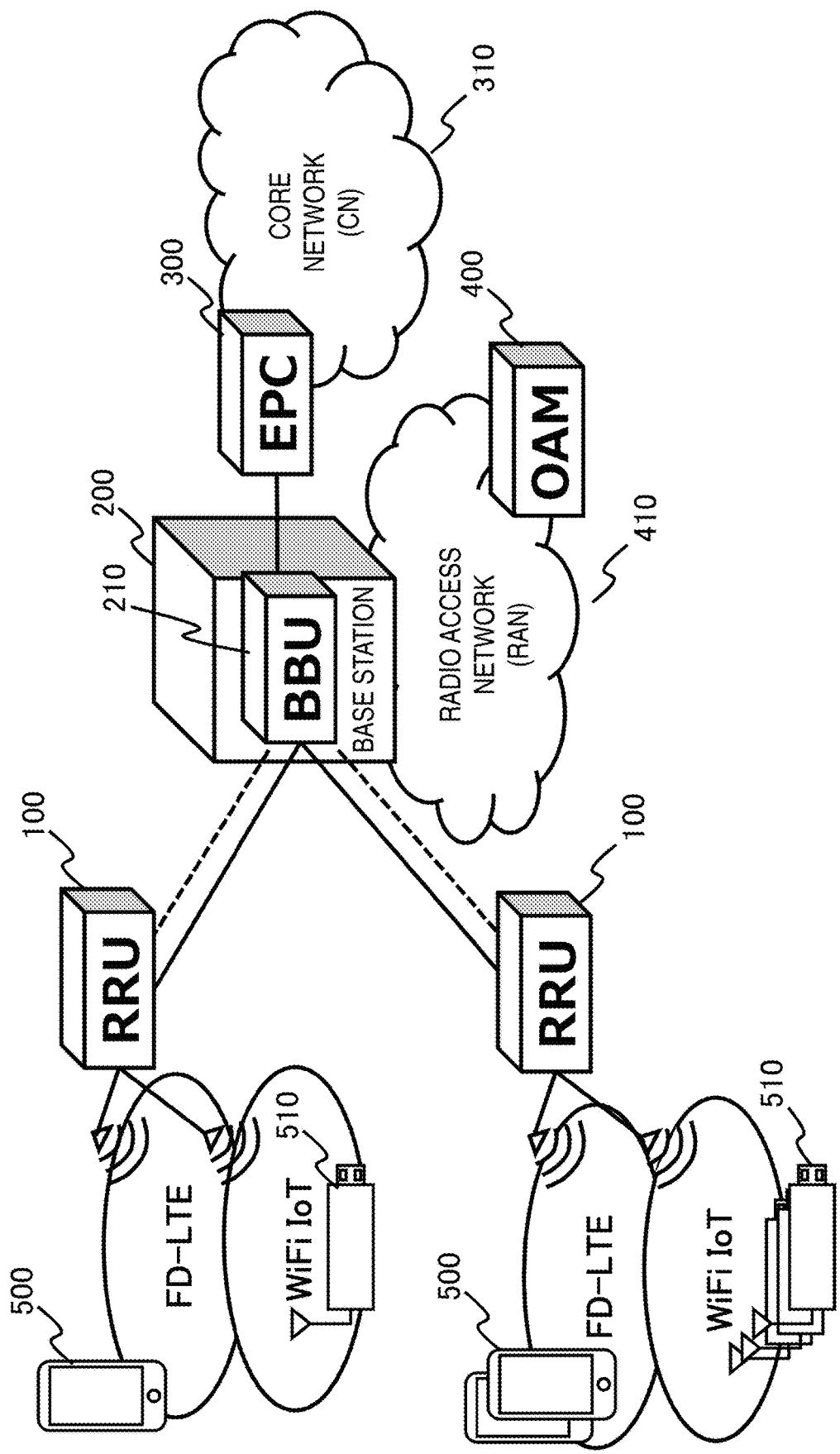
FIG. 3 is a diagram showing a configuration of a radio communication system in a first exemplary embodiment of the disclosure.

Next, a detailed description is given concerning a first exemplary embodiment of the present disclosure, making reference to the drawings. FIG. 3 is a diagram showing a configuration of a radio communication system in a first exemplary embodiment of the disclosure. Referring to FIG. 3, a radio access network (RAN) 410 is shown, which connects a plurality of RRUs (Remote Radio Unit) 100 to a BBU (Base Band Unit) 210, disposed in a base station (also called a Central Office) 200. It is to be noted that in the configuration of FIG. 3, equipment on an end user side including the base station 200 is called a fronthaul. In the present exemplary embodiment, in the fronthaul, the RRU 100 and the BBU 210 are disposed opposite each other.

An RRU 100 is a remote installation type base station that provides radio access service to a terminal 500 or sensor terminal 510, by various types of RAT (Radio Access Technology) such as LTE (Long Term Evolution) or WiFi (registered trademark). It is to be noted that the RRUs 100 are also called Remote Radio Heads, Remote Radio Equipment, but in the present specification the notation RRU is used.

The BBU 210 performs baseband processing of signals received from the RRUs 100 and transmits to a core network 310 side. The BBU 210 demodulates signals received from the core network 310 side and transmits to the RRU 100.

The abovementioned RRUs 100 and BBU 210 are connected by wired (for example, an optic cable) or wireless active system links (solid line in FIG. 3), and standby system links (broken line in FIG. 3). Communication between the RRUs 100 and the BBU 210 may use CPRI (Common Public Radio Interface), OBSAI (Open Base Station Architecture Initiative), or the like. Below, in the present exemplary embodiment a description is given in which CPRI is used for communication between the RRUs 100 and the BBU 210.

It is to be noted that in FIG. 3, an EPC 300 of the core network 310 connected to the BBU 210 represents equipment known as Evolved Packet Core such as an MME (Mobility Management Entity), S-GW (Serving Gateway), P-GW (PDN Gateway) or the like. OAM (Operations, Administration, Maintenance) equipment 400 in FIG. 3 represents equipment for performing network operation, administration and maintenance. In the present exemplary embodiment, it functions as a user interface that receives various types of configuration for the BBU 210 or RRUs 100.

Figure 9:
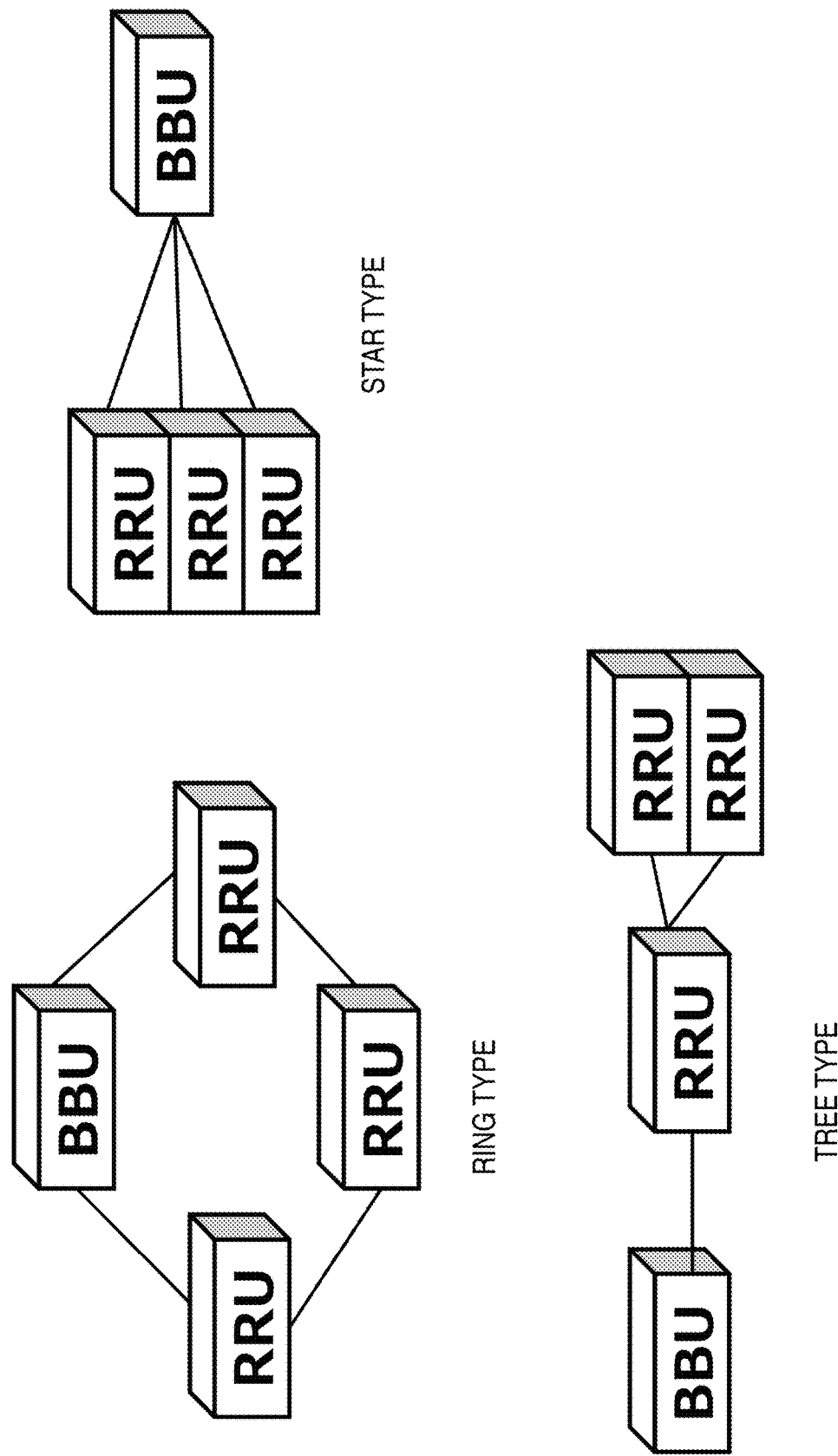
FIG. 9 is a diagram showing an example of topology configurations of BBU and RRU in the first exemplary embodiment of the disclosure.

FIG. 3 illustrates an example in which two RRUs 100 are connected in a star shape to one BBU 210, but the number of RRUs 100 connected to one BBU 210 and the connection topology of the BBU 210 and RRUs 100 are not limited to the example of FIG. 3. For example, as shown in FIG. 9 described below, a ring type, star type, tree type or a topology of a combination of various types thereof may be used.

FIG. 4 is a diagram showing a configuration of an access network node represented by the abovementioned RRUs 100 and BBU 210. FIG. 4 illustrates a configuration provided with a DL separating part 151, a link monitoring part 152, a UL separating part 153, a topology collating part 154, an alarm detection part 155, a data priority level determination part 156, an APS controller 157, an ETC controller 158, a UL switch part 159, and a DL switch part 160.

The DL separating part 151 performs frame separation from a multiplexed received signal of a downward link (DL), and transmits to the link monitoring part 152.

The UL separating part 153 performs frame separation from a multiplexed received signal of an upward link (UL), and transmits to the link monitoring part 152.

The link monitoring part 152 uses LLDP (Link Layer Discovery Protocol), SNMP (Simple Network Management Protocol) or the like, to monitor the state of a link. When a link down or the like between adjacent nodes is detected, the link monitoring part 152 gives notification of link information of the link down, to the topology collating part 154. The link monitoring part 152 measures data rate and delay state of a received frame, and transmits the result to each of the alarm detection part 155 and the data priority level determination part 156. As data rate information, BLER (Block Error Rate) or FER (Frame Erasure Rate/Frame Error Rate), used in Signal Degrade, may be measured. As delay state, Timing Advance value used in latency or LTE may be measured.

The topology collating part 154 refers to topology information pre-set by an NW configuration setting UI (user interface) part 401 of the OAM 400, to confirm whether or not a change has occurred in the pre-set topology. As a result of the confirmation, in a case where a change in topology is determined to have occurred, the topology collating part 154 makes a request for output of a topology mismatch alarm to the alarm detection part 155.

The alarm detection part 155 confirms whether or not a frame received from the link monitoring part 152 satisfies a pre-set alarm output condition, and if the alarm output condition is satisfied, determines that an alarm should be outputted (alarm detection). The alarm detection part 155 outputs an alarm also in a case where output of a topology mismatch alarm is requested from the topology collating part 154. Specifically, the alarm detection part 155 performs an operation to write an instruction to the APS controller 157 in a prescribed region of a header of a received frame. It is to be noted that for the alarm output condition, a threshold pre-set from the alarm setting UI part 402 of the OAM 400 may be used.

The APS controller 157 controls the UL switch part 159 or the DL switch part 160, based on a determination result of the alarm detection part 157, and implements APS (Automatic Protection Switching). For APS control, for example, it is possible to use a mechanism similar to a protection function that uses K1, K2 bytes of a SDH (Synchronous Digital Hierarchy).

FIG. 5 is an example of a header format used in APS control. For example, in a case of writing a bit string "1101" or "1100" indicating signal fail (SF) at the alarm detection part 155, the APS controller 157 recognizes that a signal fail has occurred at a link (channel) handled by b1 to b4 in FIG. 19, and performs a switching operation to a standby link.

Figure 6:
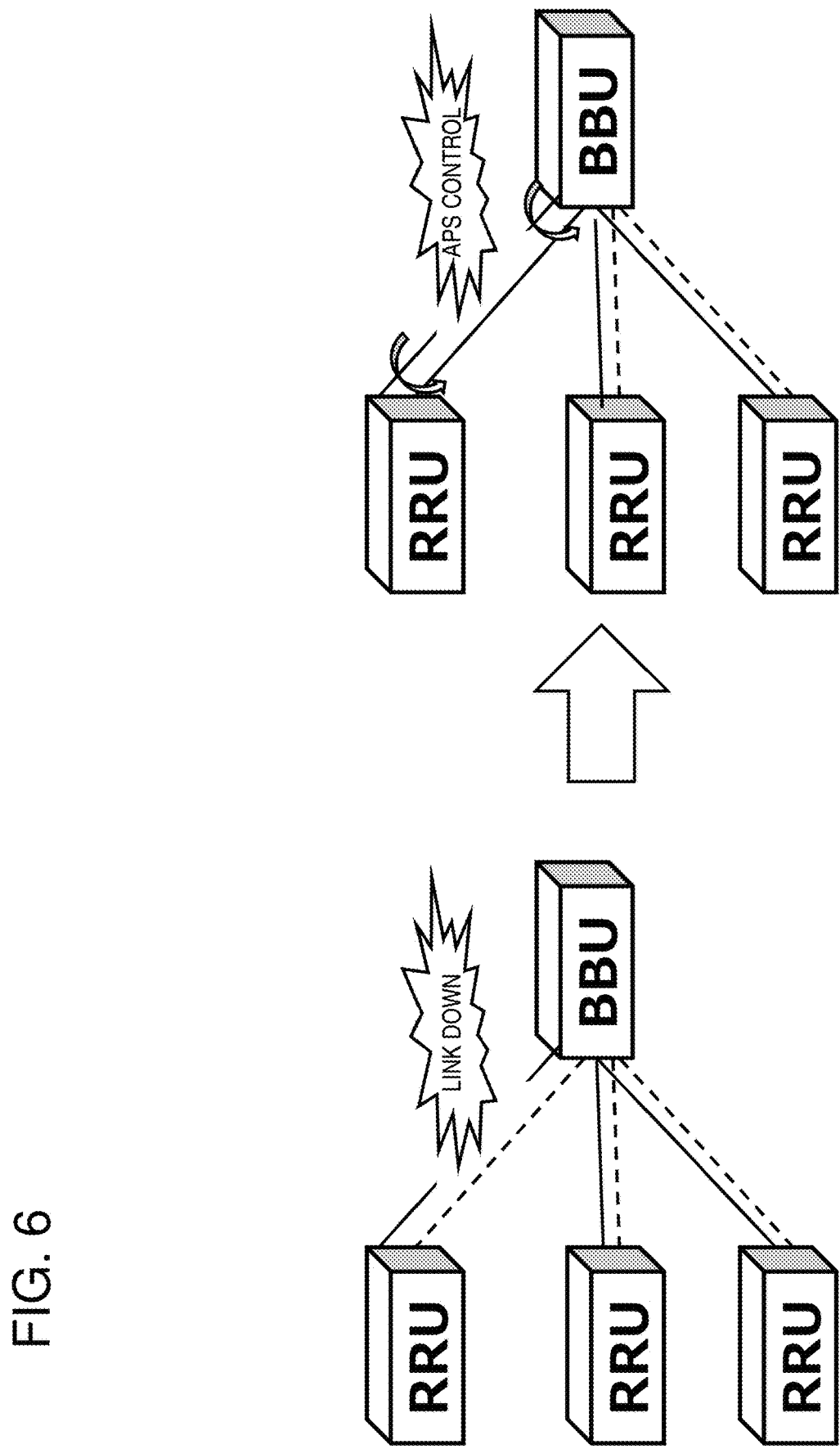
FIG. 6 is a diagram illustrating a protection operation when there is a link down in the first exemplary embodiment of the disclosure.

At the topology collating part 154, in a case where a failure (link down) occurs between an RRU and a BBU and a change in topology is detected, the APS controller 157 performs an operation to switch a link used in data exchange between the RRU and BBU, to standby (broken line) from active (solid line), as shown in FIG. 6.

The data priority level determination part 156 measures received traffic, and performs calculation from a pattern thereof, as severity level and data priority level when data is lost at that time. In accordance with whether or not the calculated data priority level exceeds a threshold pre-set from a terminal use setting UI part 403 of the OAM 400, the data priority level determination part 156 performs an operation of writing an instruction to the ETC controller 158 in a prescribed region of a header of the received frame.

The ETC controller 158 decides whether or not to flow data to an active or a standby link (ETC (Extra Traffic Channel)), based on a determination result of the data priority level determination part 156, and controls the UL switch part 159 or the DL switch part 160.

The UL switch part 159 and the DL switch part 160 perform a switching operation to active or standby for a link used in transmitting data to be sent, in accordance with an instruction from the APS controller 157 or the ETC controller 158.

It is to be noted that for convenience in the description of the configuration of FIG. 4, DL and UL are separated as in the DL separating part 151 and the UL separating part 153, and the UL switch part 159 and the DL switch part 160, but the two may also be integrated.

Figure 7:
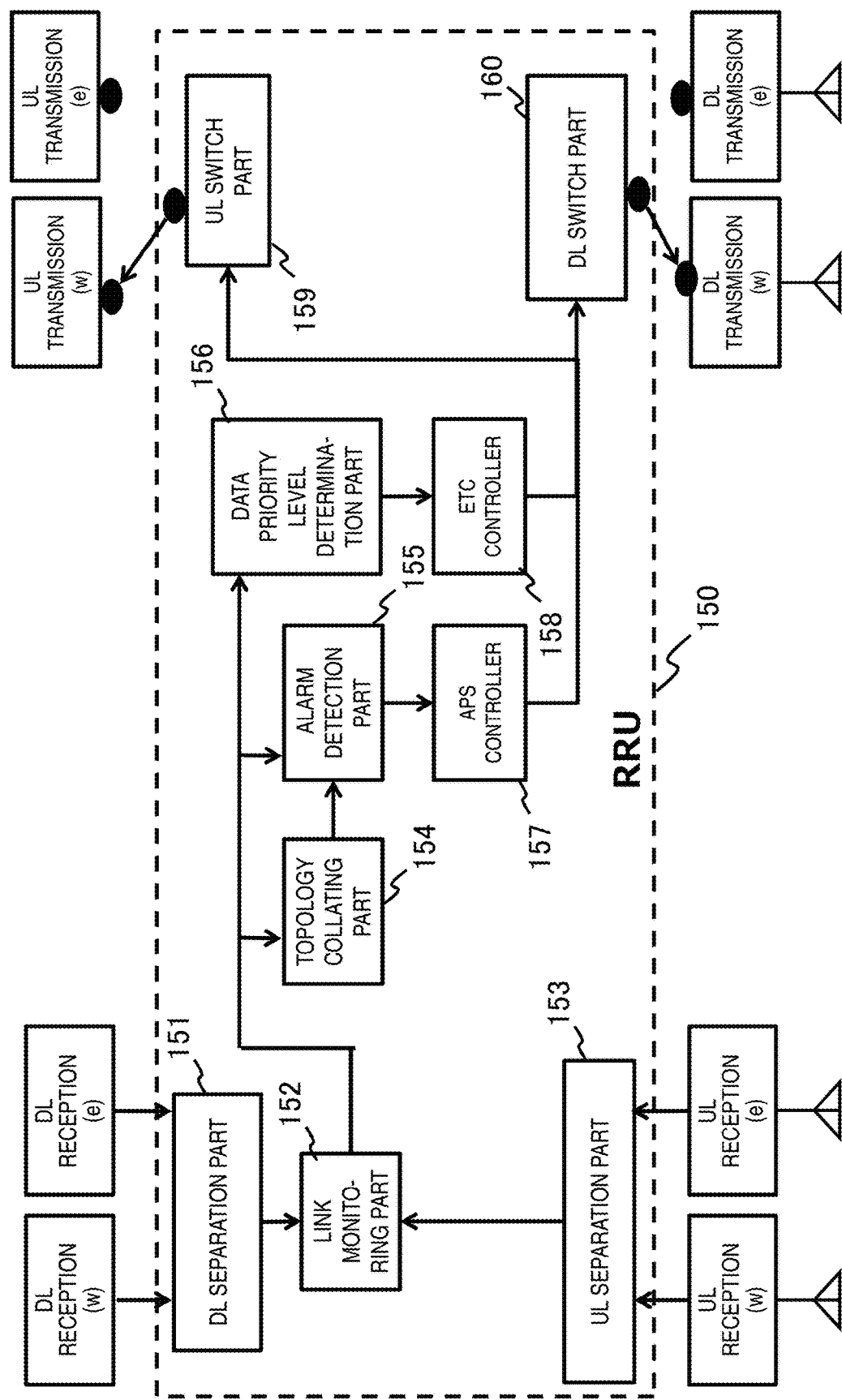
FIG. 7 is a diagram showing a configuration of an RRU in the first exemplary embodiment of the disclosure.

The above concerns functionality of an access network node, but the configuration of the access network node is changed in accordance with functionality held by the node in question. For example, in a case of the RRU 100, since a terminal is accommodated, downward link alarm detection and protection operation are unnecessary. FIG. 7 is a diagram showing a configuration of the RRU 100; and an antenna is provided for communication with the terminal 500 or the sensor terminal 510, on the UL receiving, DL transmitting side in FIG. 4.

Figure 8:
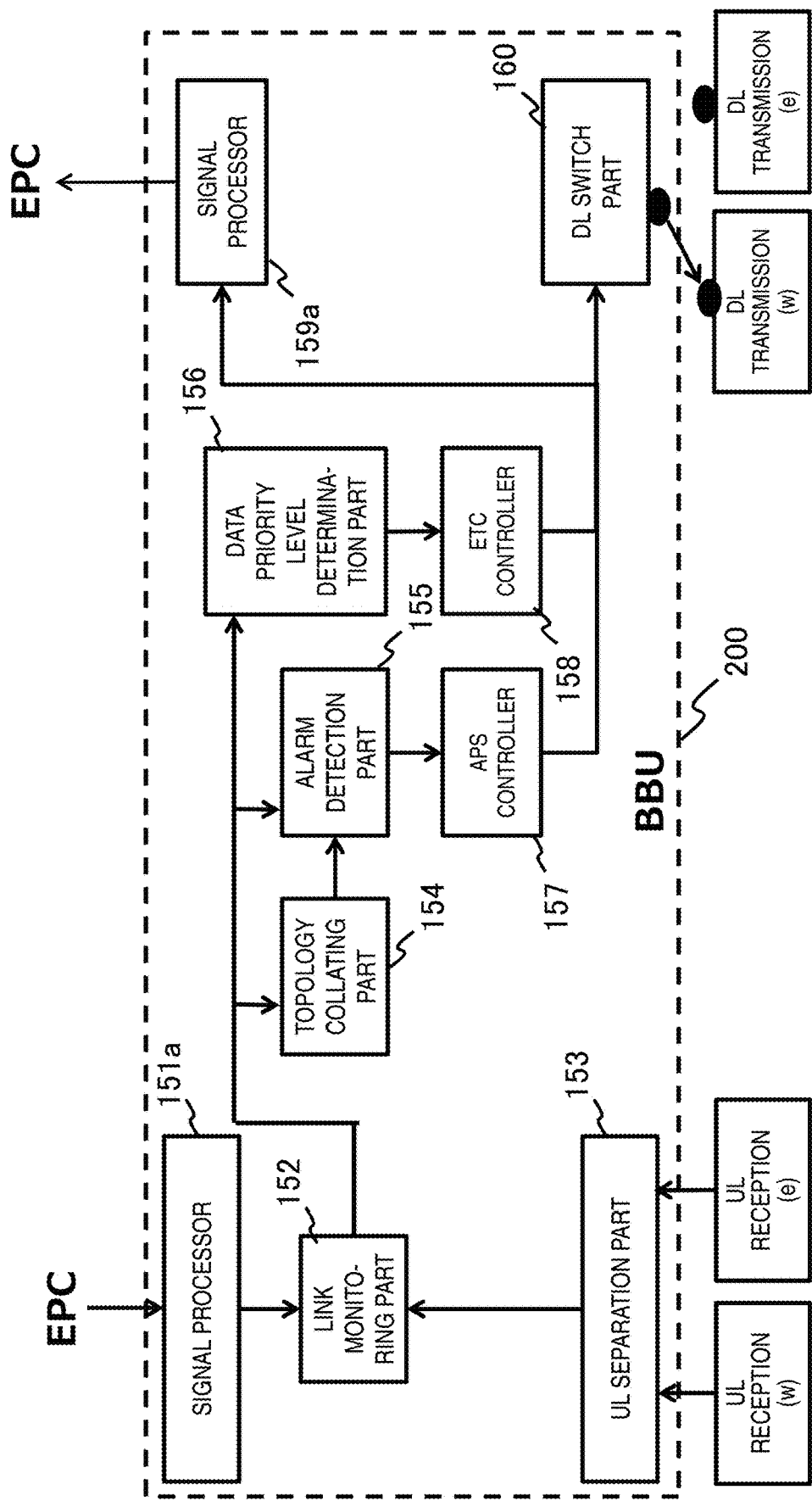
FIG. 8 is a diagram showing a configuration of a BBU in the first exemplary embodiment of the disclosure.

Similarly, for the BBU 210, upward link alarm detection and protection operation, with regard to the EPC 300 side, are unnecessary. FIG. 8 is a diagram showing a configuration of the BBU 210; the DL separating part 151 and the UL switch part 159 of FIG. 4 are respectively switched to signal processors 151a, 159a that perform baseband processing and the like.

It is to be noted that in the abovementioned description an example is used in which two RRUs 100 are connected in a star shape to one BBU 210, but for connection topology of the BBU 210 and the RRUs 100, a ring type, star type, tree type or a combination thereof may be used, as shown in FIG. 9.

Figure 10:
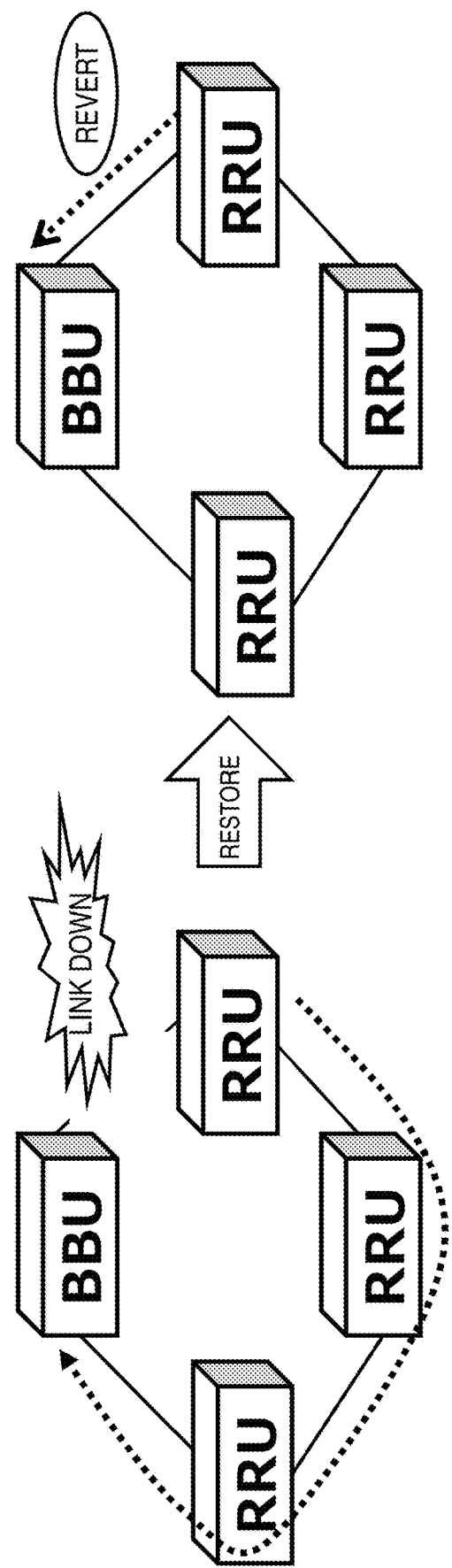
FIG. 10 is a diagram illustrating a protection operation (ring type) when there is a link down in the first exemplary embodiment of the disclosure.

APS operation in the APS controller may also change in accordance with a change of the abovementioned topology. For example, for a ring type topology as shown in FIG. 10, a link on the left side seen from a certain node may be used as active, and a link on the right side may be used as standby. In this case, when a failure (link down) occurs in the active link (right side) between a certain BBU 210 and RRU 100, a protection operation switching to a link on the left side is performed.

Figure 11:
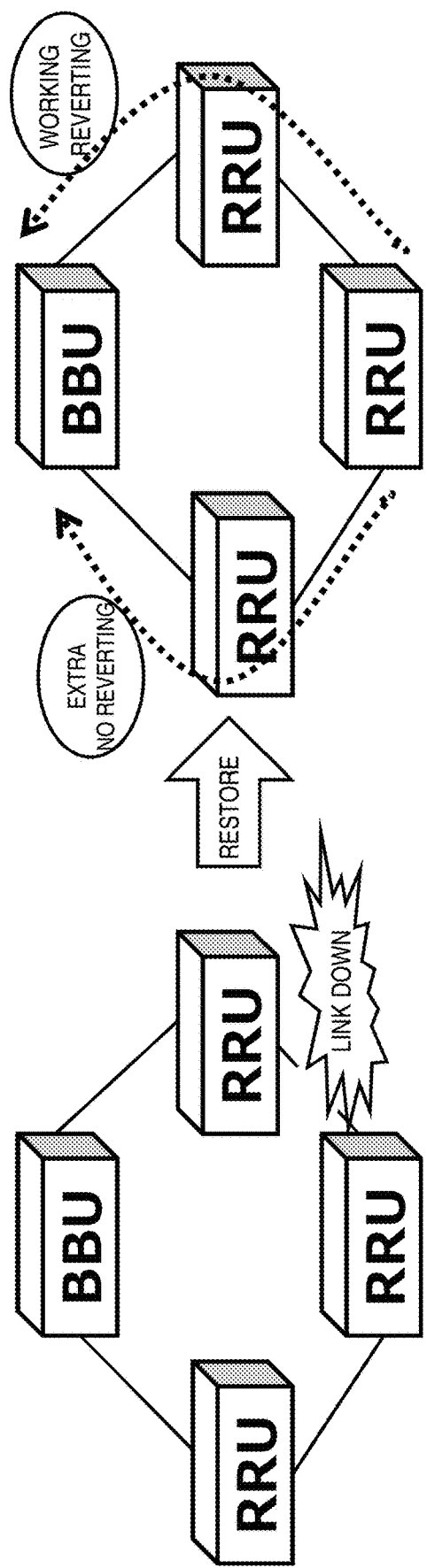
FIG. 11 is a diagram illustrating another example of a protection operation (ring type) when there is a link down in the first exemplary embodiment of the disclosure.

In a case of ring type topology, it is possible to change an operation at a time of restoring also, in accordance with setting. In general, at a time of restoring, a reverting operation returning to an original active link is performed. However, in the present exemplary embodiment, reverting is performed with regard to high priority level data (Working), as shown in FIG. 11, in accordance with a determination result in the data priority level determination part 156, and operation is also possible in which reverting is not performed with regard to data (Extra) other than this, as a target of subsequent protection.

"Severity Level"

Continuing, a description is given concerning a specific calculation method for data priority level in the data priority level determination part 156 in the present exemplary embodiment.

FIG. 12 is a diagram showing a calculation example of data priority level in the first exemplary embodiment of the disclosure. UT in FIG. 12 is an identifier indicating type and usage of a terminal included in subscriber information referred to as UE Usage Type. Service represents type of traffic used in calculation of data priority level. Severity Level is a value representing data priority level, and is calculated by a formula where the larger the positive value of this value, the higher the severity level of loss. In the example of FIG. 12, Emergency has the highest value, and next, Online Game (AR), Live Streaming, Web browsing, and the like, have high values. The data priority level determination part 156 described above performs an operation to determine whether or not there should be a flow to the ETC (Extra Traffic Channel), based on these values. For example, control is performed to flow Sensing data (IoT) where Severity Level has a negative value to the ETC, and other items where Severity Level is 0 or greater: Emergency, Online Game (AR), Live Streaming, Web browsing and Voice, to active.

The Severity Level (SL) as above may be calculated, for example, according to the following formula (1).

$$SL = \text{Log}_2(p/1-p) \tag{1}$$

Here, P is data loss probability, 1−p is probability of normal transmission. $\text{Log}_2$ is a binary logarithm. That is, formula (1) obtains the exponent portion of a binary logarithm expression as to what multiple the loss probability p is of the probability 1−p of normal transmission. Formula (1) is also called a log it function (inverse function of logistic function), and antilogarithm portion p/1−p is called odds ratio. Since these are used in general purpose chips and function libraries, they have merit for implementation.

The value of the abovementioned Severity Level may change according to how the data loss probability p is calculated. FIGS. 13A-13D are diagrams showing the value the Severity Level should have for a representative traffic pattern. FIG. 13A waveform pattern is seen in online gaming or the like where an irregular burst of data occurs. In this case, since the effect of a case where data is lost at certain timing is large, the Severity Level should be calculated as a high value.

FIG. 13B waveform pattern is seen in a sensor terminal or the like where data is collectively sent regularly. In this case, data loss of a prescribed scope is not a problem, but if this continues for longer than a fixed time, the effect is large. This type of traffic Severity Level should be calculated as medium to low.

FIG. 13C waveform pattern is seen in video calling or the like, with data volume constantly changing. In this case also, if data loss continues for longer than a fixed time, the effect is large. This type of traffic Severity Level should be calculated as high to medium.

FIG. 13D waveform pattern is seen in a sensor terminal or the like where a small volume of data is sent in real time. In this case, since data loss of a prescribed scope is not a problem, the Severity Level of this type of traffic is calculated to be low.

Figure 14:
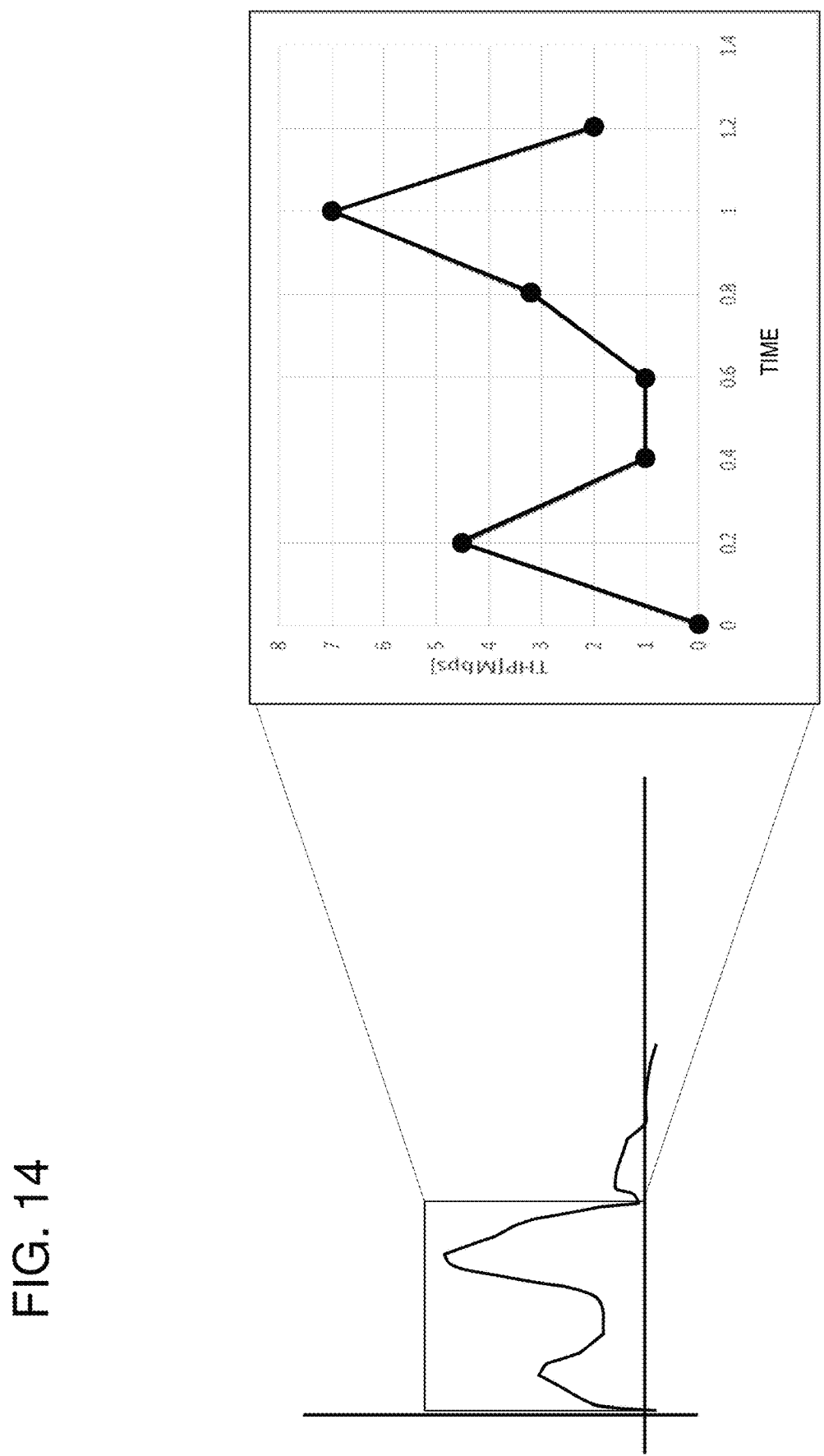
FIG. 14 is a diagram illustrating a calculation method of Severity Level in the first exemplary embodiment of the disclosure.

Continuing, a description is given concerning a calculation method in which the abovementioned Severity Level is obtained. If traffic as shown on the left side of FIG. 14 (vertical axis is throughput, horizontal axis is time) is sampled at a sampling period of 0.2 seconds for example, a graph is obtained as shown in on the right side of FIG. 14 where throughput (THP) changes to 4.5 Mbps, 1.0 Mbps, 1.0 Mbps, 3.2 Mbps, 7.0 Mbps, 2.0 Mbps.

Here, if a threshold for determining loss (loss determination throughput threshold) is 3.5 Mbps, timing of 0.2 (seconds), 1.0 (seconds) is normal, and outside of that, a determination of loss is made, as shown in FIG. 15. At this time, loss probability p in the abovementioned formula (1) is 4/6; probability of normal transmission is 2/6. Using this result, the Severity Level is calculated as "1". It is to be noted that the threshold for determining loss (loss determination throughput threshold) preferably changes in accordance with assumed terminal type and quality of traffic.

Figure 16:
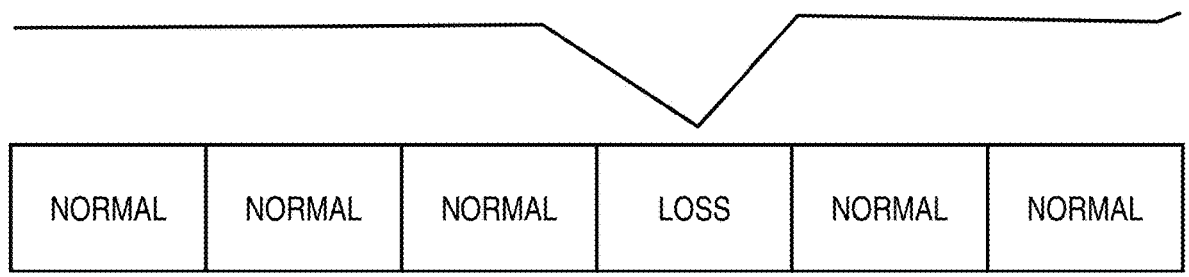
FIG. 16 is a diagram showing another calculation example of Severity Level in the first exemplary embodiment of the disclosure.

Similarly, as shown in the upper portion of FIG. 16, traffic data with little change, as with a sensor terminal, is obtained. Here, when the loss determination throughput threshold is 0.1 Mbps, the Severity Level is "−2.32", as shown in the lower part of FIG. 16.

Figure 17:
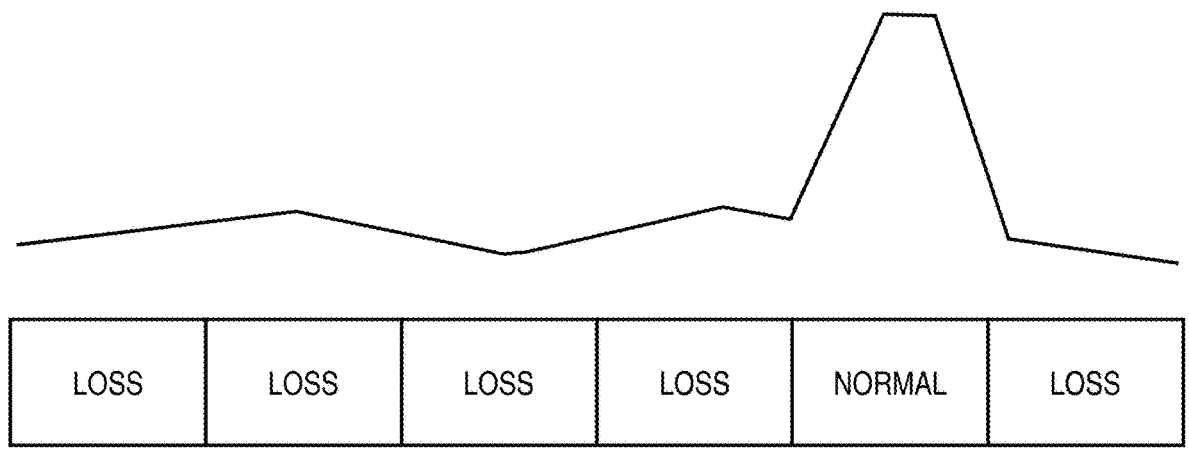
FIG. 17 is a diagram showing another calculation example of Severity Level in the first exemplary embodiment of the disclosure.

Similarly, as shown in the upper portion of FIG. 17, traffic data where a data burst occurs is obtained. Here, when the loss determination throughput threshold is 3.5 Mbps, the Severity Level is "2.32", as shown in the lower part of FIG. 17.

It is to be noted that, instead of SL it is possible to simply use information volume Log (1/p) of loss probability p, but in this case, when the loss probability p is extremely low, the information volume Log (1/p) is high; since it will be taken to have value, it is not suitable. Clearly, by a threshold or measured interval, if it is possible to arrange such that the loss probability p is not extremely low, it is possible to use the information volume Log (1/p) of loss probability p, as index indicating data priority level.

Clearly, the calculation of data priority level by the abovementioned formula (1) is merely one example. For example, it is also possible to calculate throughput distribution, number of occurrences of burst data per unit time, or the like, to calculate data priority level. Furthermore, data priority level may be calculated by adding Priority Level determined for each QCI (QoS Class Identifier) as shown in FIG. 18.

"ETC Control"

Continuing, a description is given concerning a switching operation of a link based on the abovementioned data priority level. FIG. 19 is a diagram showing a configuration of ETC control data used in the first exemplary embodiment of the disclosure. Similar to the APS control data shown in FIG. 5, by the data priority level determination part 156 writing an instruction to the ETC controller 158 in a prescribed region of a header of a received frame, it is possible to realize switching of a transmission link. For example, in the example of FIG. 19, by having 4 bits, b1 to b4, as "1111", it is possible to give an instruction to switch to a standby link.

In a case where multiple standby links exist, as shown in FIG. 20, by having b5 bits as "1:1+N", specification may be made using, for example, Reserved bits: b6 to b8 bits.

As described above, according to the present exemplary embodiment it is possible to flow important data, especially data of high severity level when data is lost, to an active link, and to make an APS target as necessary. According to the present exemplary embodiment, since data of low priority level as represented by sensor data is transmitted using a standby link, effective network usage is possible.

Second Exemplary Embodiment

Figure 21:
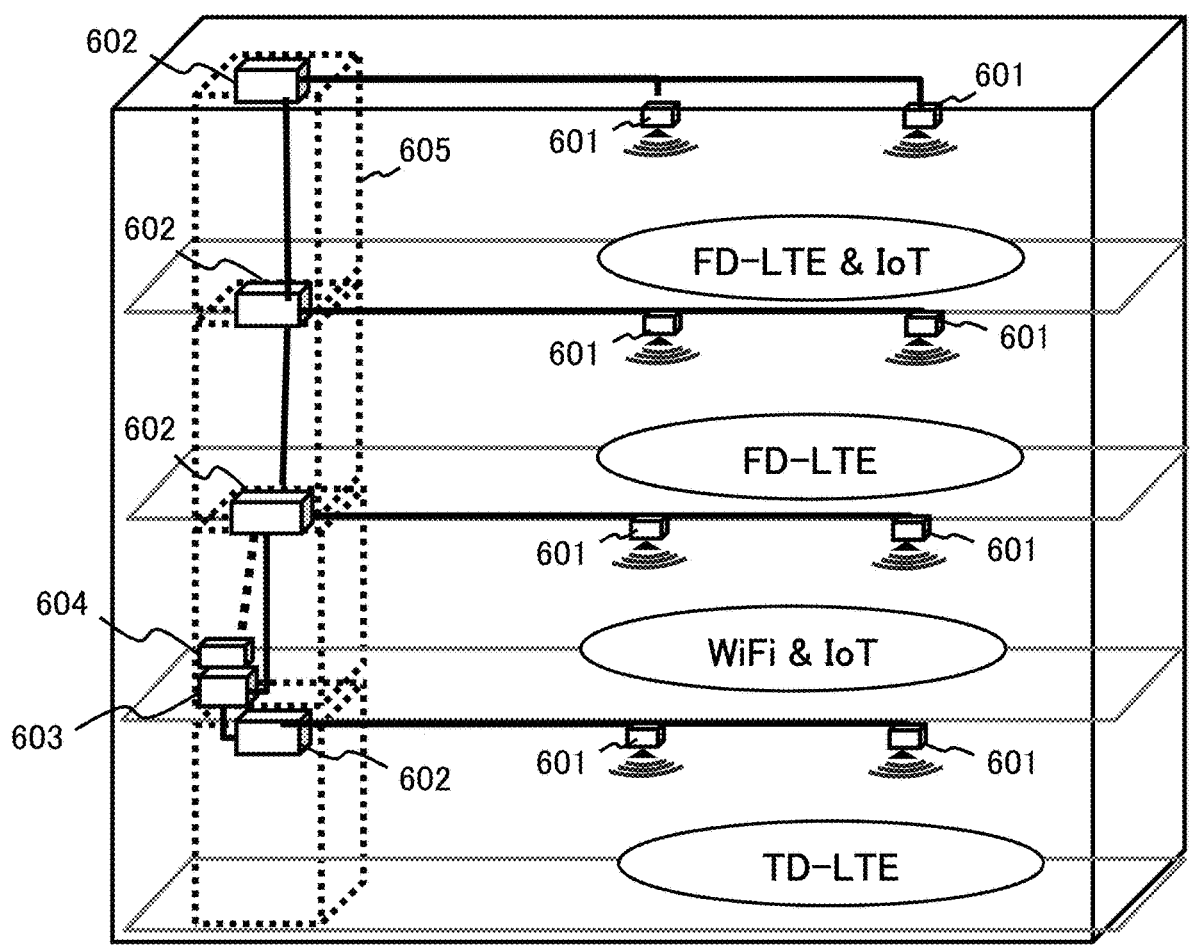
FIG. 21 is a diagram showing a configuration of a radio communication system in a second exemplary embodiment of the disclosure.

In the abovementioned first exemplary embodiment, the present disclosure was described citing an example applied to an access network node (RRU, BBU) configuring a C-RAN, but application scope of the present disclosure is not limited thereto. For example, as shown in FIG. 21, application is also possible to link redundancy between handset and base part, and base part and base station, in a configuration where handsets 601 corresponding to various types of RAT are disposed on each floor of a building, the handsets connect to a base part 603 via repeaters 602, and the base part 603 is connected to a base station 604. In this case, configurations shown in the abovementioned FIG. 4, FIG. 7 and FIG. 8 are added to the handset—base part—base station.

Operation of the second exemplary embodiment is similar to the first exemplary embodiment; a data priority level determination part 156 and an alarm detection part 155 each disposed at an access network node (handset, base part, base station) give instructions to an ETC controller 158 or an APS controller 157.

As described above, the present disclosure may be applied also to an indoor radio access network, and the radio access network may be equipped with a protection function and a link selection function based on data priority level.

Third Exemplary Embodiment

Figure 22:
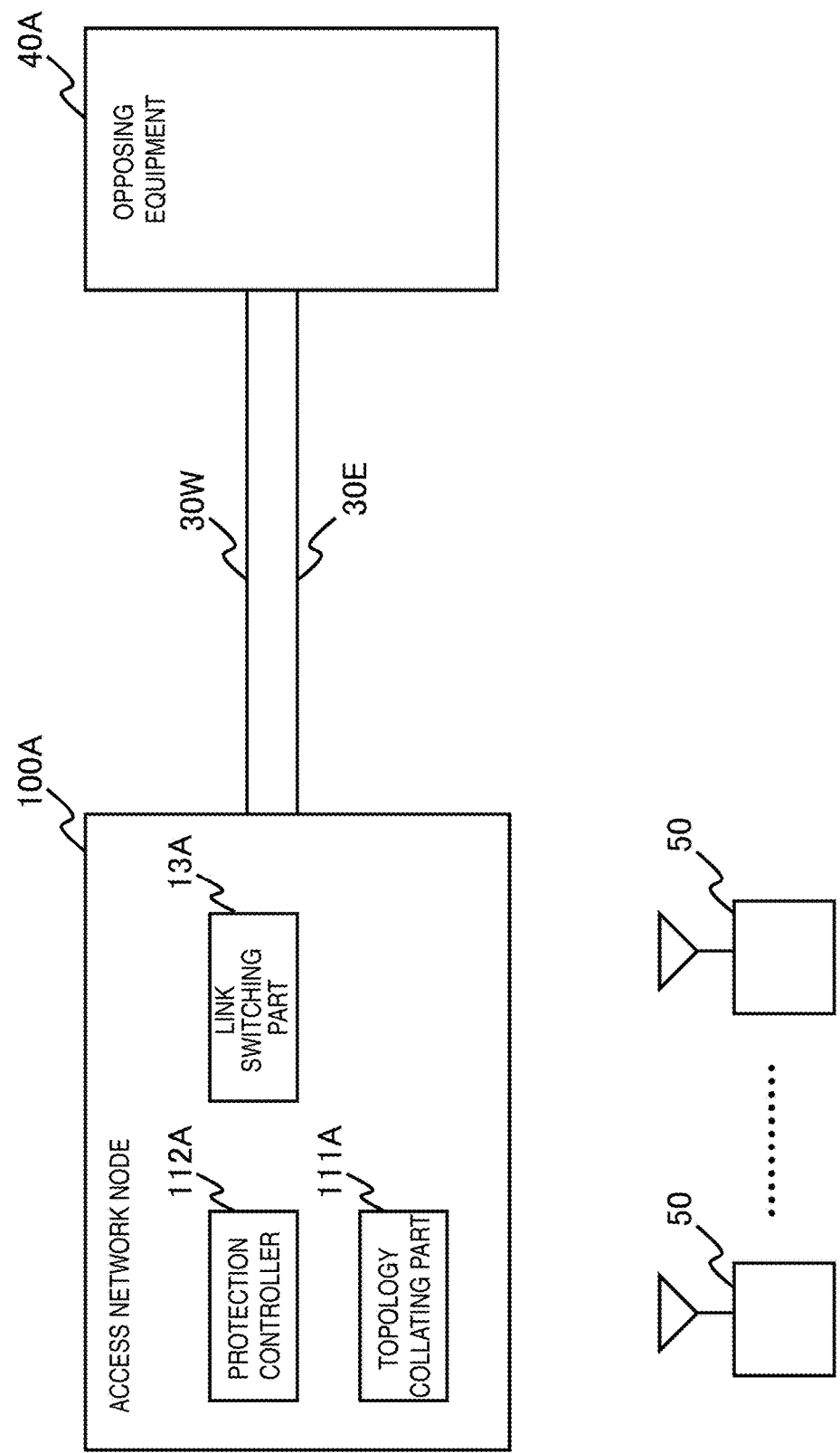
FIG. 22 is a diagram showing a configuration of a radio communication system in a third exemplary embodiment of the disclosure.

In the abovementioned first and second exemplary embodiments, a description was given in which an access network node is provided with a data priority level determination part, but a configuration may also be used in which the data priority level determination part is omitted. For example, as shown in FIG. 22, it is possible to use a configuration provided with a link switching part 13A that is capable of exchanging data by switching an active link provided with an adjacent node and a standby link, a topology collating part 111A, and a protection controller 112A.

The configuration has a protection function which, in a case where an anomaly occurs in the network topology, switches traffic flowing to an active link to a standby link. In this case, a topology collating part 111A confirms network topology configured by the active link and the standby link. In a case where an anomaly occurs in the network topology, the protection controller 112A performs a protection operation to switch traffic flowing to the active link to the standby link. In this type of configuration, the protection controller 112A may perform an operation similar to the alarm detection part 155 and the APS controller 157 of the abovementioned first exemplary embodiment, and may perform a link switching operation when there is a Signal Failure (SF) or a Signal Degrade (SD).

A description has been given above of respective exemplary embodiments of the present disclosure, but the present disclosure is not limited to the abovementioned exemplary embodiments, and modifications, substitutions and adjustments may be added within a scope that does not depart from fundamental technical concepts of the disclosure. For example, network configurations, respective element configurations and header information expression configurations shown in the respective drawings are examples for the purpose of aiding understanding of the disclosure and are not intended to limit the disclosure to configurations illustrated in the drawings.

For example, in the various exemplary embodiments described above, descriptions were given in which an active link and a standby link existed between 2 access network nodes, but 3 or more links may be provided, and among them, with 1 or more as standby, protection control may be performed by 2 active system links. The standby links may be radio links; and in a case where the active links are radio links, a redundant configuration is realized by radio links.

It is to be noted that the respective parts (processing means) of the access network nodes, RRU and BBU, shown in FIG. 4, FIG. 7 and FIG. 8 may be implemented by a computer program that executes the abovementioned respective processing on a processor installed in these devices, using hardware thereof.

Finally, preferred modes of the present disclosure are summarized.

<First Mode>
(Refer to the access network node according to the first aspect described above.)

<Second Mode>
A configuration may be used, comprising, instead of the data identification part of the access network node described above, a data priority level determination part that calculates an index indicating severity level when data is lost, wherein the controller selects a link to be used in exchanging data with the accommodated terminal, by comparing the index with a prescribed threshold.

<Third Mode>
In the access network node described above, the index may be calculated using a logarithm of a value obtained by dividing loss probability p of data exchanged with the accommodated terminal, by probability (1−p) of normal communication.

<Fourth Mode>
The data loss probability p may be calculated using a proportion by which throughput measured each prescribed time period is less than a prescribed threshold.

<Fifth Mode>
The logarithm base and threshold are preferably set so that, at least, sensor data exchanged with an accommodated sensor terminal flows to the standby link.

<Sixth Mode>
The abovementioned access network node further comprises a topology collating part that confirms network topology configured by the active link and a standby link, and a configuration may be used that has a protection function that switches traffic flowing in the active link to a standby link, in a case where an anomaly occurs in the network topology.

<Seventh Mode>
An access network node comprising a link switching part that is capable of exchanging data by switching between an active link and a standby link established with an adjacent node; and a topology collating part that confirms network topology configured by the active link and the standby link; and having a protection function that switches traffic flowing in the active link to the standby link, in a case where an anomaly occurs in the network topology.

<Eighth Mode>
The abovementioned access network node, wherein the active link and the standby link are optical or radio links between an RRU (Remote Radio Unit) and a BBU (Base Band Unit) and the access network node may have a configuration to function as an RRU or a BBU.

<Ninth Mode>
(Refer to the radio communication system according to the second aspect described above.)

<Tenth Mode>
(Refer to the communication method according to the third aspect described above.)

<Eleventh Mode>
(Refer to the program according to the fourth aspect described above.) It is to be noted that the ninth to eleventh modes described above may be expanded with regard to the second to eighth modes, similar to the first mode.

It is to be noted that the various disclosures of the abovementioned Patent Literature are incorporated herein by reference thereto. Modifications and adjustments of exemplary embodiments and examples may be made within the bounds of the entire disclosure (including the scope of the claims) of the present disclosure, and also based on fundamental technological concepts thereof. Various combinations and selections of various disclosed elements (including respective elements of the respective claims, respective elements of the respective exemplary embodiments and examples, respective elements of the respective drawings and the like) are possible within the scope of the disclosure of the present disclosure. That is, the present disclosure clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10A access network node
11A data identification part
12A controller
13A link switching part
30A opposing equipment
30W active link
30E standby link
40A opposing equipment
50 terminal
100 RRU (Remote Radio Unit)
111A topology collating part
112A protection controller
151 DL separating part
151a signal processor
152 link monitoring part
153 UL separating part
153a UL receiving part
154 topology collating part
155 alarm detection part
156 data priority level determination part
157 APS controller
158 ETC controller
159 UL switch part
159a signal processor
160 DL switch part
160a DL transmission part
200 base station (Central Office)
210 BBU (Base Band Unit)
300 EPC
310 core network
400 OAM
401 NW configuration setting UI part
402 alarm setting UI part
403 terminal use setting UI part
410 radio access network (RAN)
500 terminal
510 sensor terminal
601 handset
602 repeater
603 base part
604 base station

The invention claimed is:

1. A communication method by an access network node comprising:
at least a processor; and
a memory in circuit communication with the processor, wherein the processor is configured to execute program instructions stored in the memory to implement: a link switching part configured to be capable of exchanging data by switching between an active link and a standby link established with an adjacent node:
the method comprising:
identifying type of data to be exchanged with an accommodated terminal; and
selecting, from between the active link and the standby link, a link to be used in exchanging data with the accommodated terminal, based on the data type; and
instead of the identifying type of data, calculating an index indicating severity level when the data is lost; wherein
the selecting a link comprises selecting a link to be used in exchanging data with the accommodated terminal, by comparing the index with a prescribed threshold.

2. The communication method by an access network node according to claim 1,
the method further comprising:
confirming network topology configured by the active link and the standby link; and
performing a protection operation that switches traffic flowing in the active link to the standby link, in a case where an anomaly occurs in the network topology.

3. An access network node comprising:
at least a processor; and
a memory in circuit communication with the processor, wherein the processor is configured to execute program instructions stored in the memory to implement:
a link switching part configured to be capable of exchanging data by switching between an active link and a standby link established with an adjacent node;
a data identification part configured to identify type of data to be exchanged with an accommodated terminal; and
a controller configured to select, from between the active link and the standby link, a link to be used in exchanging data with the accommodated terminal, based on the data type; and
a data priority level determination part, instead of the data identification part, which is capable to calculate an index indicating severity level when the data is lost; wherein
the controller selects a link to be used in exchanging data with the accommodated terminal, by comparing the index with a prescribed threshold.

4. The access network node according to claim 3, wherein the processor is configured to execute the program instructions to implement:
a topology collating part configured to confirm network topology configured by the active link and the standby link;
and having a protection function that switches traffic flowing in the active link to the standby link, in a case where an anomaly occurs in the network topology.

5. The access network node according to claim 4, wherein the active link and the standby link are optical or radio links between an RRU (Remote Radio Unit) and a BBU (Base Band Unit) and function as an RRU or a BBU.

6. The access network node according to claim 3, wherein the active link and the standby link are optical or radio links between an RRU (Remote Radio Unit) and a BBU (Base Band Unit) and function as an RRU or a BBU.

7. The access network node according to claim 3, wherein the processor is configured to execute the program instructions to implement:
a topology collating part configured to confirm network topology configured by the active link and the standby link;
and having a protection function that switches traffic flowing in the active link to the standby link, in a case where an anomaly occurs in the network topology.

8. The access network node according to claim 3, wherein the active link and the standby link are optical or radio links between an RRU (Remote Radio Unit) and a BBU (Base Band Unit) and function as an RRU or a BBU.

9. The access network node according to claim 3, wherein the index is calculated using a logarithm of a value obtained by dividing loss probability p of data exchanged with the accommodated terminal, by probability (1−p) of normal communication.

10. The access network node according to claim 9, wherein the data loss probability p is calculated using a proportion by which throughput measured each prescribed time period is less than a prescribed threshold.

11. The access network node according to claim 10, wherein the logarithm base and threshold are set so that sensor data exchanged with an accommodated sensor terminal flows to the standby link.

12. The access network node according to claim 10, wherein the processor is configured to execute the program instructions to implement:
a topology collating part configured to confirm network topology configured by the active link and the standby link;
and having a protection function that switches traffic flowing in the active link to the standby link, in a case where an anomaly occurs in the network topology.

13. The access network node according to claim 10, wherein the active link and the standby link are optical or radio links between an RRU (Remote Radio Unit) and a BBU (Base Band Unit) and function as an RRU or a BBU.

14. The access network node according to claim 9, wherein the logarithm base and threshold are set so that sensor data exchanged with an accommodated sensor terminal flows to the standby link.

15. The access network node according to claim 14, wherein the active link and the standby link are optical or radio links between an RRU (Remote Radio Unit) and a BBU (Base Band Unit) and function as an RRU or a BBU.

16. The access network node according to claim 9, further comprising:
a topology collating part configured to confirm network topology configured by the active link and the standby link;
and having a protection function that switches traffic flowing in the active link to the standby link, in a case where an anomaly occurs in the network topology.

17. The access network node according to claim 9, wherein the active link and the standby link are optical or radio links between an RRU (Remote Radio Unit) and a BBU (Base Band Unit) and function as an RRU or a BBU.

* * * * *